US009246848B2

(12) United States Patent
Nagatomo et al.

(10) Patent No.: US 9,246,848 B2
(45) Date of Patent: Jan. 26, 2016

(54) RELAY APPARATUS, STORAGE SYSTEM, AND METHOD OF CONTROLLING RELAY APPARATUS

(71) Applicant: FUJITSU LIMITED, Kawasaki-shi, Kanagawa (JP)

(72) Inventors: Hideki Nagatomo, Yokohama (JP); Atsushi Masaki, Kawasaki (JP); Mitsuru Maejima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 13/924,725

(22) Filed: Jun. 24, 2013

(65) Prior Publication Data

US 2014/0003444 A1 Jan. 2, 2014

(30) Foreign Application Priority Data

Jun. 29, 2012 (JP) ................................. 2012-147380

(51) Int. Cl.
*H04L 12/54* (2013.01)
*H04L 12/931* (2013.01)
*H04L 12/24* (2006.01)

(52) U.S. Cl.
CPC .......... *H04L 49/357* (2013.01); *H04L 41/0886* (2013.01); *H04L 41/0809* (2013.01)

(58) Field of Classification Search
None
See application file for complete search history.

(56) References Cited

U.S. PATENT DOCUMENTS

2003/0028808 A1* 2/2003 Kameda ........................ 713/201
2004/0250061 A1* 12/2004 Yamauchi et al. ............ 713/155

FOREIGN PATENT DOCUMENTS

| EP | 1367781 A2 | 12/2003 |
| JP | 2003-330762 | 11/2003 |
| JP | 2005-51750 | 2/2005 |
| JP | 2007-304896 | 11/2007 |

* cited by examiner

*Primary Examiner* — Hoon J Chung
(74) *Attorney, Agent, or Firm* — Staas & Halsey LLP

(57) ABSTRACT

There is provided a relay apparatus configured to relay data transmitted and received between a plurality of devices, the relay apparatus includes an input unit configured to receive inputting of device group information, a first device and a second device being registered in the device group information, data transmission and reception between the first device and the second device being allowed, a setting unit configured to detect devices connected to respective communication ports of the relay apparatus and to register, in port group information, information associated with the communication ports respectively connected to the first device and the second device when the first device and the second device are connected to the relay apparatus, and a communication control unit configured to enable transmission and reception of data between the communication ports registered in the port group information.

12 Claims, 12 Drawing Sheets

RELAY APPARATUS, STORAGE SYSTEM, AND METHOD OF CONTROLLING RELAY APPARATUS

CROSS-REFERENCE TO RELATED APPLICATION

This application is based upon and claims the benefit of priority of the prior Japanese Patent Application No. 2012-147380, filed on Jun. 29, 2012, the entire contents of which are incorporated herein by reference.

FIELD

The embodiments discussed herein are related to a relay apparatus, a storage system, and a method of controlling a relay apparatus.

BACKGROUND

Fibre Channel (hereinafter referred to as FC) is a typical communication protocol used in a Storage Area Network (SAN) system in which a storage apparatus is connected to a computer serving as a server apparatus or the like. In SAN systems using FC, an FC switch is generally used to connect a server apparatus to a storage apparatus.

Port zoning is known as a technique to control the FC switch in terms of accessing. In this technique, ports of the FC switch are grouped in units of zones, and accessing is allowed only between ports included in each zone. The port zoning technique provides an advantage that setting is allowed without depending on connected devices.

In an example of an FC switch using the port zoning technique, physical ports on a side of storage apparatuses are virtually grouped, and physical ports in a group in an access path are switched depending on a load on the FC switch.

A technique to automatically correct a wrong connection in a switch is known. For example, in an optical switch having two inputs and two outputs, when a receiving unit has a received signal level lower than a particular value or when synchronization of a received signal is unstable, the switching is performed in a manner inverted from the initial manner.

Descriptions of related techniques may be found, for example, in Japanese Laid-open Patent Publication No. 2003-330762, Japanese Laid-open Patent Publication No. 2007-304896, Japanese Laid-open Patent Publication No. 2005-51750, etc.

SUMMARY

According to an aspect of the invention, a relay apparatus configured to relay data transmitted and received between a plurality of devices includes an input unit configured to receive inputting of device group information, a first device and a second device being registered in the device group information, data transmission and reception between the first device and the second device being allowed, a setting unit configured to detect devices connected to respective communication ports of the relay apparatus and to register, in port group information, information associated with the communication ports respectively connected to the first device and the second device when the first device and the second device are connected to the relay apparatus, and a communication control unit configured to enable transmission and reception of data between the communication ports registered in the port group information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preliminary Consideration

In an FC switch in which port zoning is set, when a device is connected to a wrong port in a zone, accessing may be enabled between an unexpected pairs of devices. This may, for example, disable a server apparatus to perform correct accessing to a storage apparatus. Furthermore, there may be a possibility that data in the storage apparatus is corrupted.

Embodiments provide a relay apparatus, a storage system, and a method of controlling a relay apparatus, capable of inhibiting a device from being connected incorrectly.

Embodiments are described below with reference to drawings.

First Embodiment

Figure 1:
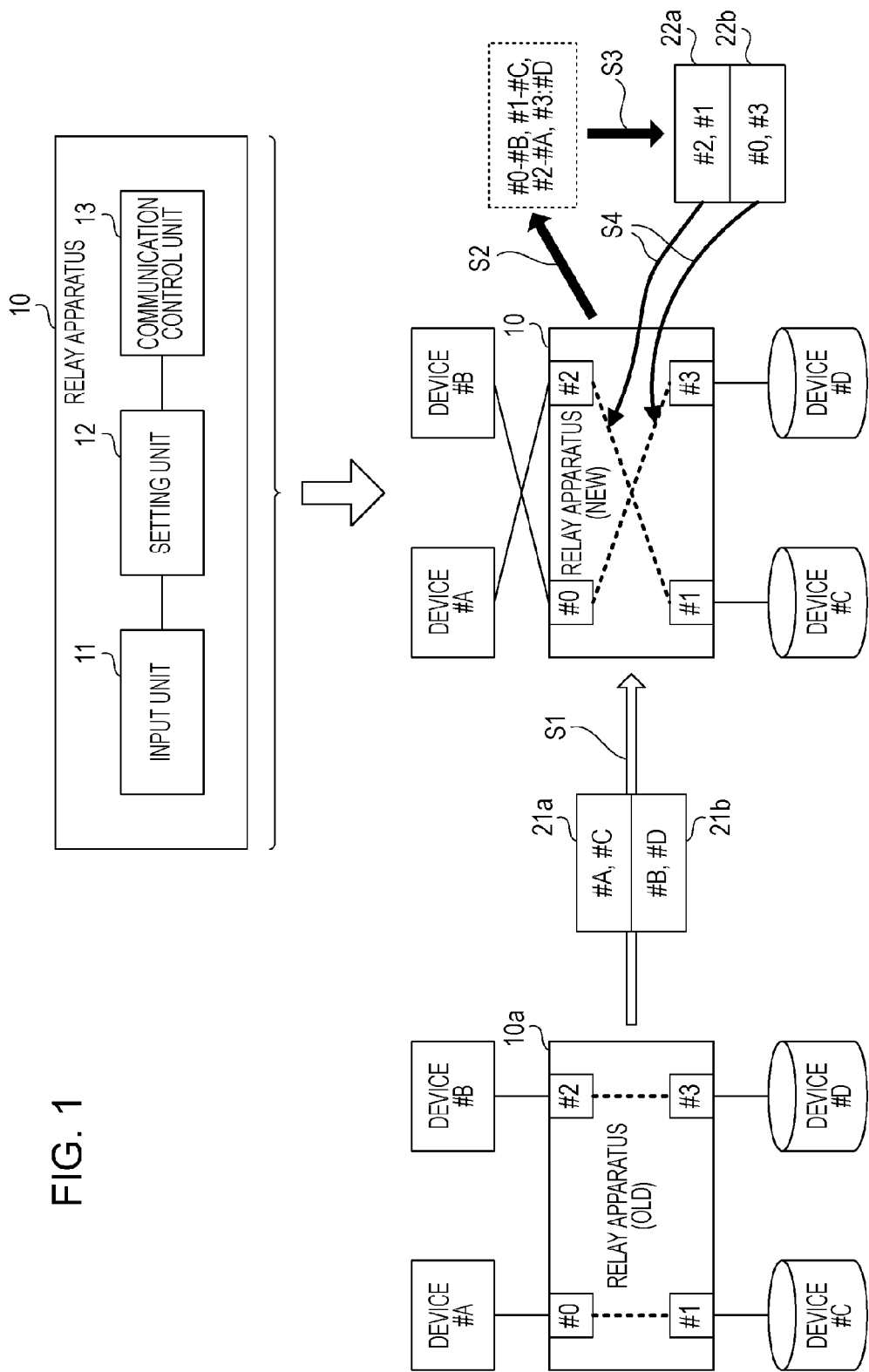
FIG. 1 is a diagram illustrating an example of a configuration and an example of an operation of a relay apparatus according to an embodiment.

FIG. 1 is a diagram illustrating an example of a configuration and an example of an operation of a relay apparatus according to a first embodiment.

A relay apparatus 10 is an apparatus configured to relay data that is transmitted between a plurality of devices. The relay apparatus 10 includes a plurality of communication ports each capable of being connected to a device. The relay apparatus 10 has port group information in each of which a plurality of communication ports (for example, two communication ports) are registered. The relay apparatus 10 enable transmission and reception of data between communication ports set in the port group information. This makes it possible to transmit and receive data between devices connected to communication ports set in the port group information.

The relay apparatus 10 includes an input unit 11, a setting unit 12, and a communication control unit 13. The input unit 11 is configured to receive inputting of device group information in which a first device and a second device are registered as a pair of devices between which transmission and reception of data are to be enabled. For example, when a relay apparatus is replaced, device group information is generated by the relay apparatus before it is replaced. The input unit 11 may also receive device group information from, for example, an external management apparatus. Furthermore, the input unit 11 may read device group information from a portable storage medium.

The setting unit 12 detects devices currently connected to the relay apparatus 10. When the first device and the second device registered in the device group information are connected to the relay apparatus 10, the setting unit 12 sets port group information such that communication ports respectively connected to the first device and the second device are registered in the port group information. Thus, the communication ports are registered in one piece of port group information so as to indicate a pair of communication ports respectively connected to devices specified by the device group information as a pair of devices between which transmission and reception of data are to be enabled.

The communication control unit 13 controls transmission and reception of data between communication ports based on the port group information. That is, the communication control unit 13 enables the data transmission/reception between the communication ports registered in the port group information.

By performing the process described above, the relay apparatus 10 enables transmission and reception of data between the communication ports respectively connected to the devices specified by the device group information as a pair of devices between which transmission and reception of data are allowed. Therefore, regardless of which device is connected to which communication port, the relay apparatus 10 relays data only between devices allowed to transmit and receive data to each other. This inhibits a wrong pair of devices from being connected.

Next, an operation of the relay apparatus is described below by way of example for a case where the relay apparatus is replaced. In the following description, it is assumed as illustrated in a lower part of FIG. 1 that a relay apparatus 10a, to which devices #A to #D are connected, is replaced with a new relay apparatus 10.

It is assumed that in the old relay apparatus 10a before it is replaced, based on port group information (not illustrated), data transmission/reception is allowed between a communication port #0 and a communication port #1, and between a communication port #2 and a communication port #3. It is also assumed that the communication port #0 is connected to the device #A, the communication port #1 to the device #C, the communication port #2 to the device #B, and the communication port #3 to the device #D. Thus, the device #A is allowed to communicate with the device #C via the relay apparatus 10a, and the device #B is allowed to communicate with the device #D via the relay apparatus 10a.

When replacement is performed, the relay apparatus 10a generates and outputs device group information including identification information identifying the first device and the second device between which data transmission/reception is allowed. In the example illustrated in FIG. 1, the relay apparatus 10a generates device group information 21a in which the devices #A and #C are registered, and device group information 21b in which the devices #B and #D are registered.

On the other hand, the input unit 11 of the new relay apparatus 10 receives the device group information 21a and device group information 21b generated by the old relay apparatus 10a (step S1). The setting unit 12 of the relay apparatus 10 detects, for each communication port, identification information of each of devices currently connected to the relay apparatus 10.

It be assumed that, in the relay apparatus 10, the communication port #0 is connected to the device #B, the communication port #1 to the device #C, the communication port #2 to the device #A, and the communication port #3 to the device #D. That is, in the relay apparatus 10, due to a connection error made by an operator or for some reason, the identification numbers of the communication ports connected to the respective devices #A and #B are different from those in the replaced relay apparatus 10a.

The setting unit 12 of the relay apparatus 10 detects devices connected to respective communication ports, and recognizes the correspondence between each communication port and a device connected thereto (step S2). The setting unit 12 compares the connected devices with the devices registered in the device group information 21a and device group information 21b. When the first device and the second device registered in the device group information 21a and device group information 21b are connected to the relay apparatus 10, the setting unit 12 registers the communication ports connected to the respective first and second devices in the port group information (step S3).

In the example illustrated in FIG. 1, the setting unit 12 determines that the devices #A and #C registered in the device group information 21a are connected to the relay apparatus 10, and the setting unit 12 registers the communication ports #2 and #1 respectively connected to the devices #A and #C in the port group information 22a. The setting unit 12 also determines that the devices #B and #D registered in the device group information 21b are connected to the relay apparatus 10, and the setting unit 12 registers the communication ports #0 and #3 respectively connected to the devices #B and #D in the port group information 22b.

The communication control unit 13 controls transmission/reception of data between communication ports based on the port group information 22a and the port group information 22b (step S4). More specifically, the communication control unit 13 enables transmission/reception of data between the communication port #2 and the communication port #1 according to the port group information 22a. This makes it possible for the device #A and the device #C to communicate with each other as they were before the relay apparatus was replaced. Furthermore, the communication control unit 13 enables transmission/reception of data between the communication port #0 and the communication port #3 according to the port group information 22b. This makes it possible for the device #B and the device #D to communicate with each other as they were before the relay apparatus was replaced.

By performing the process described above, it becomes possible for the relay apparatus 10 to relay data between the devices specified by the device group information 21a and the device group information 21b even when the devices are connected to communication ports different from those employed by the replaced relay apparatus 10a. However, if the new relay apparatus 10 is set directly according to the port group information (the port group information associated with the communication ports #0 and #1 and the port group information associated with the communication ports #2 and #3) employed in the old relay apparatus 10a, the relay apparatus 10 allows transmission/reception of data between a wrong pair of devices. Such a problem may be reduced by the above-described process performed by the input unit 11, the setting unit 12, and the communication control unit 13.

Second Embodiment

Next, in a second embodiment described below, the above-described process associated with the relay apparatus 10 is applied to an FC switch.

Figure 2:
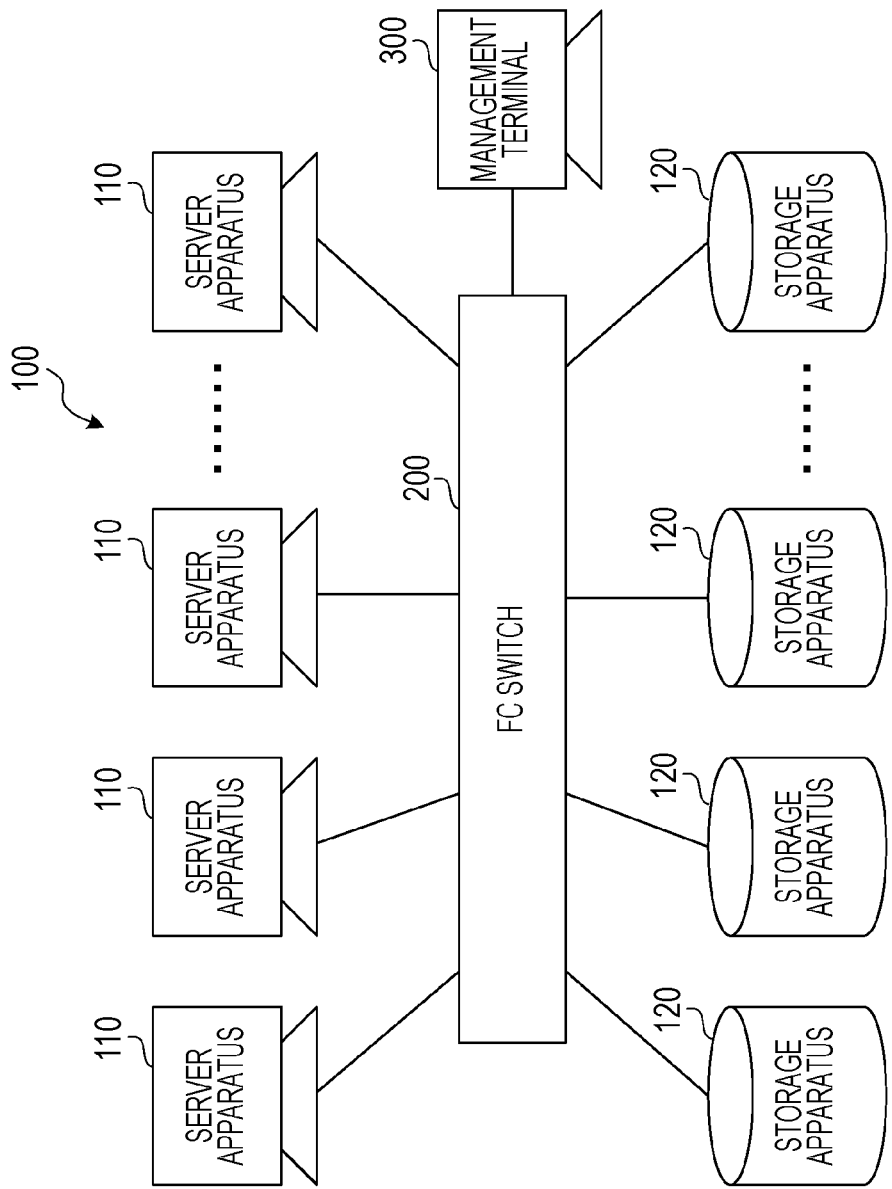
FIG. 2 is a diagram illustrating an example of a configuration of a storage system according to an embodiment.

FIG. 2 is a diagram illustrating an example of a configuration of a storage system according to the second embodiment. The storage system 100 includes a plurality of server apparatuses 110, a plurality of storage apparatuses 120, and an FC switch 200. The FC switch 200 is configured to be connectable to a management terminal 300.

Each server apparatus 110 is connected to the FC switch 200 via a FC cable. Each storage apparatus 120 is connected to the FC switch 200 also via a FC cable. Each server apparatus 110 is capable of accessing to at least one of the storage apparatuses 120 via the FC switch 200. The FC switch 200 relays data transmitted/received between the server apparatuses 110 and the storage apparatuses 120 by using the port zoning technique.

Each storage apparatus 120 may be achieved in the form of a single storage unit such as a Hard Disk Drive (HDD), a Solid State Drive (SSD), or the like, a disk array apparatus including a plurality of HDDs or SSDs, or a tape library apparatus including a magnetic tape drive, a mechanism for conveying a tape cartridge, etc.

The management terminal 300 is a terminal apparatus used by, for example, a maintenance operator to make various kinds of settings on the FC switch 200 or issue an operation command. The management terminal 300 may be connected to the FC switch 200 only when it is used to perform a maintenance operation or the like. As will be described later, when the FC switch is replaced, the management terminal 300 is capable of acquiring setting information from the FC switch before it is replaced, storing the acquired setting information, and transferring the setting information to a new FC switch after the replacement.

Figure 3:
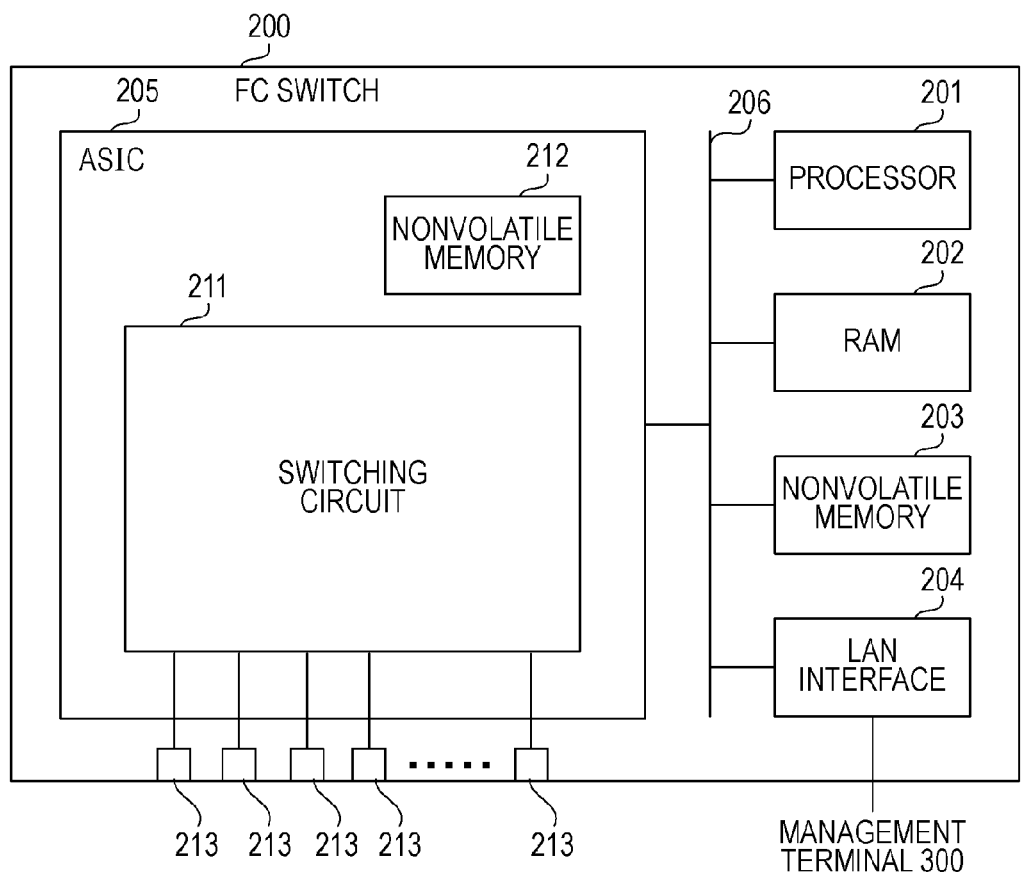
FIG. 3 is a diagram illustrating an example of a hardware configuration of an FC switch.

FIG. 3 is a diagram illustrating an example of a hardware configuration of the FC switch. All control of the FC switch 200 is performed by a processor 201. The processor 201 is connected, via a bus 206, to a Random Access Memory (RAM) 202, a nonvolatile memory 203, a Local Area Network (LAN) interface 204, and an Application Specific Integrated Circuit (ASIC) 205.

The processor 201 may be, for example, a Central Processing Unit (CPU), a Micro Processing Unit (MPU), a Digital Signal Processor (DSP), an ASIC, a Programmable Logic Device (PLD), or the like. The processor 201 may be a multiprocessor. The processor 201 may be a combination of two or more elements selected from a group including the CPU, the MPU, the DSP, the ASIC, and the PLD.

A RAM 202 is used as a main storage unit of the FC switch 200. The RAM 202 temporarily stores at least part of various kinds of firmware executed by the processor 201. The RAM 202 also stores various kinds of data used in a process performed by the processor 201.

The nonvolatile memory 203 may be, for example, a flash memory, an HDD, or the like. The nonvolatile memory 203 is used as an auxiliary storage unit of the FC switch 200. The nonvolatile memory 203 stores various kinds of firmware executed by the processor 201 and various kinds of data used in the execution of the firmware.

The LAN interface 204 transmits and receives data to or from an external device via a LAN. In the present embodiment, the LAN interface 204 is connected to the management terminal 300. The ASIC 205 includes a switching circuit 211 and a nonvolatile memory 212.

The switching circuit 211 is connected to a plurality of FC ports 213. The switching circuit 211 performs switching of data transmitted and received between devices connected to the FC ports 213 based on information set in the nonvolatile memory 212. The switching circuit 211 has a function of communicating with the devices connected to the FC ports 213 in accordance with a command issued by the processor 201. For example, in accordance with a command issued by the processor 201, the switching circuit 211 may acquire World Wide Names (WWNs) assigned to the devices connected to the FC ports 213 and may notify the processor 201 of the acquired WWNs.

The nonvolatile memory 212 stores various kinds of data used in the process associated with the switching circuit 211 performed by the processor 201. As described later, the data stored in the nonvolatile memory 212 includes a zoning setting table which is setting information associated with the port zoning.

Figure 4:
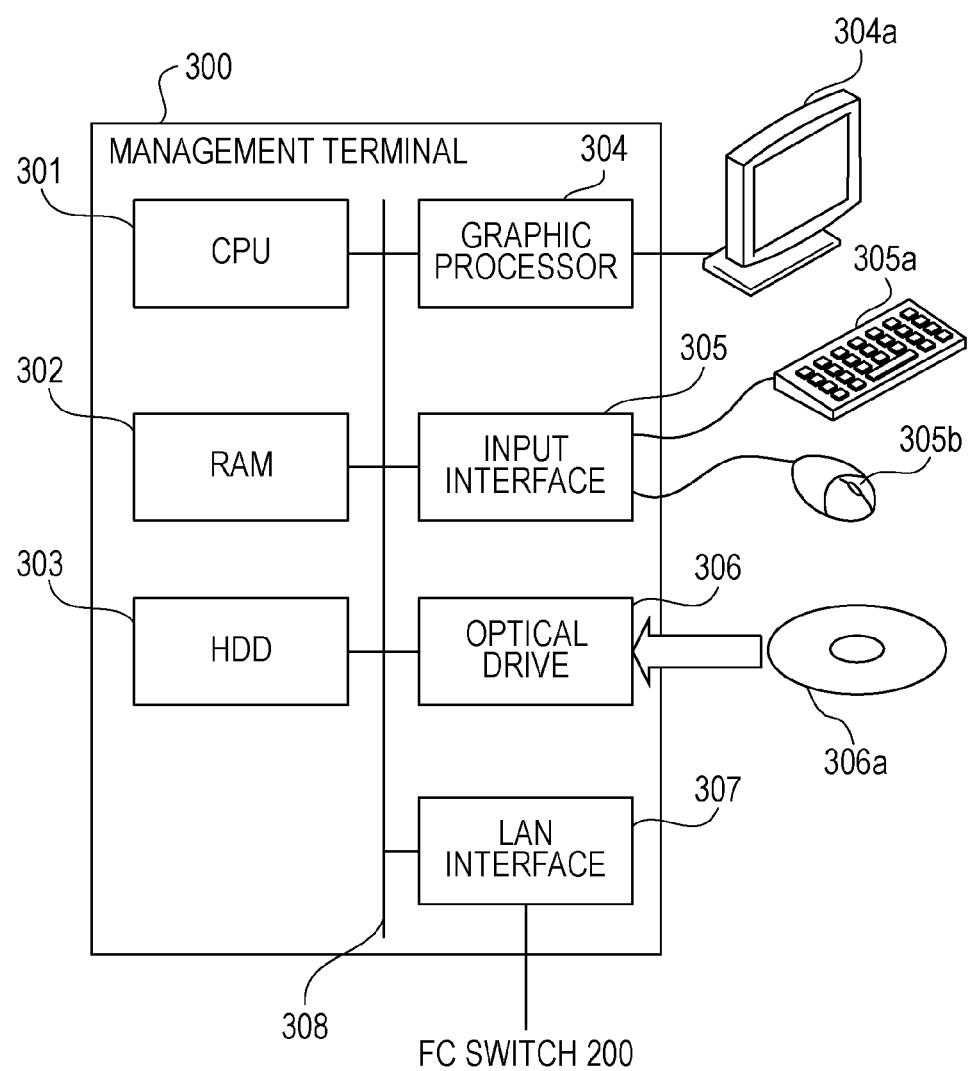
FIG. 4 is a diagram illustrating an example of a hardware configuration of a management terminal.

FIG. 4 is a diagram illustrating an example of a hardware configuration of the management terminal. The management terminal 300 may be achieved by a computer such as that illustrated in FIG. 4. All control of the management terminal 300 is performed by a processor 301. The processor 301 is connected to, via a bus 308, a RAM 302 and a plurality of peripheral devices. The processor 301 may be, for example, a CPU, an MPU, a DSP, an ASIC, a PLD, or the like. The processor 301 may be a multiprocessor. The processor 301 may be a combination of two or more elements selected from a group including the CPU, the MPU, the DSP, the ASIC, and the PLD.

The RAM 302 is used as a main storage unit of the management terminal 300. The RAM 302 temporarily stores, at least, part of an Operating System (OS) program, an application program, and the like executed by the processor 301. The RAM 302 also stores various kinds of data used in a process performed by the processor 301.

The peripheral devices connected to the bus 308 include an HDD 303, a graphic processing apparatus 304, an input interface 305, an optical drive apparatus 306, and a LAN interface 307.

The HDD 303 is used as an auxiliary storage unit of the management terminal 300. The HDD 303 stores an OS program, an application program, and various kinds of data. Note that a semiconductor storage apparatus such as a flash memory may be used as the auxiliary storage apparatus.

The graphic processing apparatus 304 is connected to a monitor 304*a*. The graphic processing apparatus 304 displays an image on a screen of the monitor 304*a* in accordance with a command from the processor 301. The monitor 304*a* may be a display apparatus using a Cathode Ray Tube (CRT), a liquid crystal display apparatus, or the like.

The input interface 305 is connected, for example, to a keyboard 305*a* and a mouse 305*b*. The input interface 305 transmits a signal received from the keyboard 305*a* or the mouse 305*b* to the processor 301. Note that the mouse 305*b* is used as a pointing device, and other types of pointing devices may be used. Examples of devices usable as the pointing device include a touch panel, a tablet, a touch pad, a trackball, etc.

The optical drive apparatus 306 reads data stored on an optical disk 306*a* using laser light or the like. The optical disk 306*a* is a removable storage medium on which data is stored such that the data is readable using reflection of light. Examples of the optical disk 306*a* include a Digital Versatile Disc (DVD), a DVD-RAM, a Compact Disc Read Only Memory (CD-ROM), a CD-R (Recordable)/RW (ReWritable), etc.

The LAN interface 307 transmits and receives data to or from an external device via a LAN. In the present embodiment, the LAN interface 307 is connected to the FC switch 200.

The management terminal 300 may be realized so as to have the hardware configuration described above. Note that each server apparatus 110 may be achieved by a computer in a similar hardware configuration to that described above with reference to FIG. 4.

Figure 5:
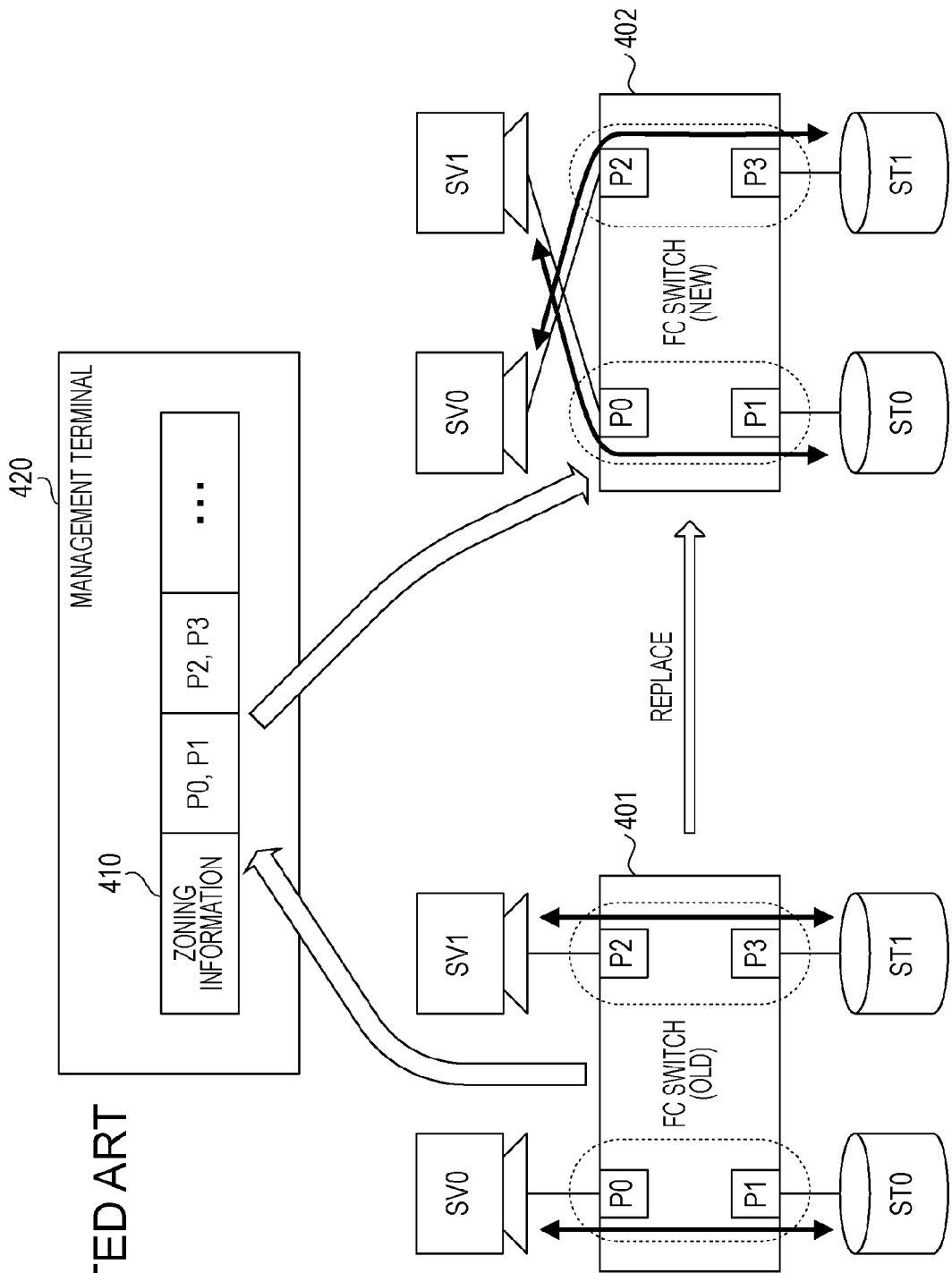
FIG. 5 is a diagram illustrating a comparative example of an operation of replacing an FC switch.

Next, a setting operation is described below which is performed when the FC switch is replaced. FIG. 5 is a diagram illustrating a comparative example of an operation of replacing an FC switch. Referring to FIG. 5, a problem is discussed below which may occur in the operation of replacing the FC switch.

In FIG. 5, an FC switch 401 is connected to a server apparatus assigned SV0 as a WWN (hereinafter referred to as the server apparatus SV0), a server apparatus assigned SV1 as a WWN (hereinafter referred to as the server apparatus SV1), a storage apparatus assigned ST0 as a WWN (hereinafter referred to as the storage apparatus ST0), and a storage apparatus assigned ST1 as a WWN (hereinafter referred to as the storage apparatus ST1).

The server apparatus SV0 is connected to an FC port assigned P0 as a port number (hereinafter referred to as the FC port P0). The server apparatus SV1 is connected to an FC port assigned P2 as a port number (hereinafter referred to as the FC port P2). The storage apparatus ST0 is connected to an FC port assigned P1 as a port number (hereinafter referred to as the FC port P1). The storage apparatus ST1 is connected to an FC port assigned P3 as a port number (hereinafter referred to as the FC port P3).

The FC switch 401 is capable of controlling accessing based on port zoning. In the FC switch 401, a zoning setting table 410 is registered as setting information for use in the port zoning. The zoning setting table 410 describes one or more registered pieces of zoning information each defining a pair of port numbers of FC ports allowed to access to each other. The FC switch 401 refers to the zoning setting table 410 and electrically connects two FC ports to each other registered in each piece of zoning information.

In the example illustrated in FIG. 5, the zoning setting table 410 registered in the FC switch 401 includes zoning information defining a pair of P0 and P1 and zoning information defining a pair of P2 and P3. Based on the zoning setting table 410, the FC switch 401 provides an electrical connection between the FC port P0 and the FC port P1 and between the FC port P2 and the FC port P3. As a result, the server apparatus SV0 is allowed to access to the storage apparatus ST0, and the server apparatus SV1 is allowed to access to storage apparatus ST1.

The setting of the port zoning does not depend on the devices connected to the FC ports. Therefore, for example, when the FC switch is replaced, the port zoning may be set in a new FC switch before the old FC switch is replaced, or when a device connected to an FC port is replaced, the port zoning setting may not be changed, which is an advantage provided by the embodiment.

However, when devices are connected to the new FC switch after the replacement, when a device is connected to a wrong FC port, a problem may occur that accessing is allowed between an unexpected pair of devices. An operation is described below for a case where the FC switch 401 illustrated in FIG. 5 is replaced by a new FC switch 402.

A maintenance operator operates, for example, the management terminal 420 to transfer the zoning setting table 410 set in the FC switch 401 to the management terminal 420. The maintenance operator then transfers the zoning setting table 410 stored in the management terminal 420 to the new FC switch 402 and sets it therein. As a result, as with the old FC switch 401, the new FC switch 402 provides an electrical connection between the FC port P0 and the FC port P1, and between the FC port P2 and the FC port P3.

By making it possible to set the zoning setting table such that the zoning setting table 410 employed in the FC switch 401 before the replacement is directly set in the FC switch 402 after the replacement, an improvement is achieved in efficiency of the setting operation performed when the FC switch is replaced, and the setting is performed in a more reliable manner.

Now, let us assume that the replacement by the maintenance operator is performed incorrectly such that the server apparatus SV0 is connected not to the correct FC port P0 but to the FC port P2, and the server apparatus SV1 is connected not to the correct FC port P2 but to the FC port P0. When the operation of the storage system is started in this state, the server apparatus SV0 is not allowed to access to the storage apparatus ST0 to which the server apparatus SV0 is expected to be allowed to access, and the server apparatus SV0 is allowed to access to the storage apparatus ST1 to which the server apparatus SV0 is not expected to be allowed to access. On the other hand, the server apparatus SV1 is not allowed to access to the storage apparatus ST1 to which the server apparatus SV1 is expected to be allowed to access, and the server apparatus SV1 is allowed to access to the storage apparatus ST0 to which the server apparatus SV1 is not expected to be allowed to access. That is, resultant a problem is that accessing to a correct storage apparatus is disabled, and accessing to a wrong storage apparatus is enabled, which may cause data stored therein to be lost.

To keep such a misconnection away, the maintenance operator may visually check whether the devices are respectively connected to correct FC ports. However, such a visual check performed by the maintenance operator is very troublesome. In particular, when the FC switch has a large number of FC ports such as 100 or more FC ports, the operation of checking the connections is significantly troublesome.

In contrast, the FC switch 200 according to the present embodiment is capable of uploading, to the management terminal 300, the device pair information indicating WWNs of devices connected to the respective FC ports registered in the zoning information. When the FC switch 200 is installed as a new apparatus in a storage system, the FC switch 200 downloads the device pair information from the management terminal 300 and acquires WWNs of the devices currently connected to the respective FC ports. The FC switch 200 generates zoning information based on port numbers of the FC ports connected to the respective devices registered in the device pair information, and registers the generated zoning information in the zoning setting table. That is, the FC switch 200 automatically generates the zoning setting table such that the devices are coupled between the same pairs as those coupled before the replacement regardless of which FC ports are physically connected to the respective devices.

Figure 6:
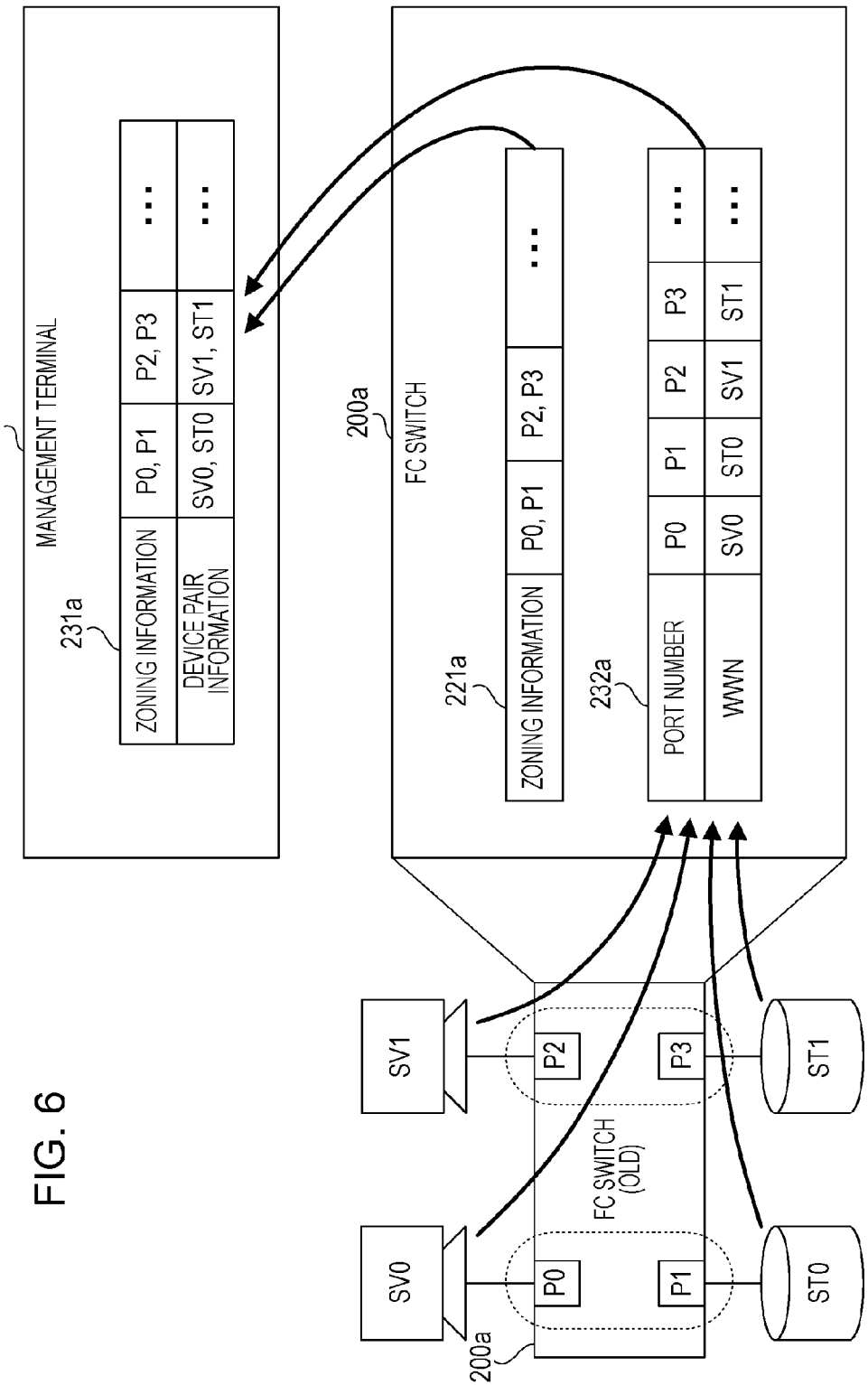
FIG. 6 is a diagram illustrating an example of a process performed when an FC switch is removed.

Next, referring to FIG. 6 and FIG. 7, a description is given below as to an example of a process performed when the replacement is performed using the FC switch 200 according to the present embodiment. In this example, an FC switch 200a illustrated in FIG. 6 is replaced by an FC switch 200b illustrated in FIG. 7. The FC switches 200a and 200b are similar in configuration to each other.

FIG. 6 illustrates an example of an operation of removing the FC switch. The FC switch 200a illustrated in FIG. 6 is connected, as with the FC switch 401 illustrated in FIG. 5, such that the server apparatus SV0 is connected to the FC port P0, the server apparatus SV1 is connected to the FC port P2, the storage apparatus ST0 is connected to the FC port P1, and the storage apparatus ST1 is connected to the FC port P3.

A zoning setting table 221a is set in the FC switch 200a. In the zoning setting table 221a, zoning information including P0 and P1 and zoning information including P2 and P3 are registered. Based on the zoning setting table 221a, the switching circuit 211 (see FIG. 3) of the FC switch 200a provides an electrical connection between the FC port P0 and the FC port P1, and between the FC port P2 and the FC port P3. As a result, the server apparatus SV0 is allowed to access to the storage apparatus ST0, and the server apparatus SV1 is allowed to access to the storage apparatus ST1.

The FC switch 200a is removed and replaced with the new FC switch 200b as described below. In response to a command from the management terminal 300, the FC switch 200a generates a connection setting table 231a according to a procedure described below, and uploads the generated connection setting table 231a to the management terminal 300.

The FC switch 200a acquires, from devices connected to the respective FC ports, WWNs of the respective devices for each FC port. The FC switch 200a temporarily registers the acquired WWNs in relation to the port numbers of the FC ports in the connected device information 232a. The FC switch 200a generates the connection setting table 231a based on the set zoning setting table 221a and the connected device information 232a.

More specifically, the FC switch 200a acquires, from the connected device information 232a, the WWN assigned to each port number described in the zoning information. The FC switch 200a then generates the connection setting table 231a such that each piece of zoning information is related to a specific piece of device pair information associated with two WWNs assigned to the port numbers included in the zoning information.

In the example illustrated in FIG. 6, the connection setting table 231a is described such that device pair information including SV0 and ST0 is related to zoning information including P0 and P1, and device pair information including SV1 and ST1 is related to zoning information including P1 and P2. The device pair information including SV0 and ST0 indicates that accessing between the server apparatus SV0 and the storage apparatus ST0 is allowed at the point of time when the FC switch is replaced. Similarly, the device pair information including SV1 and ST1 indicates that accessing between the server apparatus SV1 and the storage apparatus ST1 is allowed at the point of time when the FC switch is replaced.

The connection setting table 231a may be generated when the zoning setting table 221a is set in the FC switch 200a, and the connection setting table 231a may be stored in advance in the FC switch 200a. In this case, the FC switch 200a uploads the stored in the connection setting table 231a to the management terminal 300.

Figure 7:
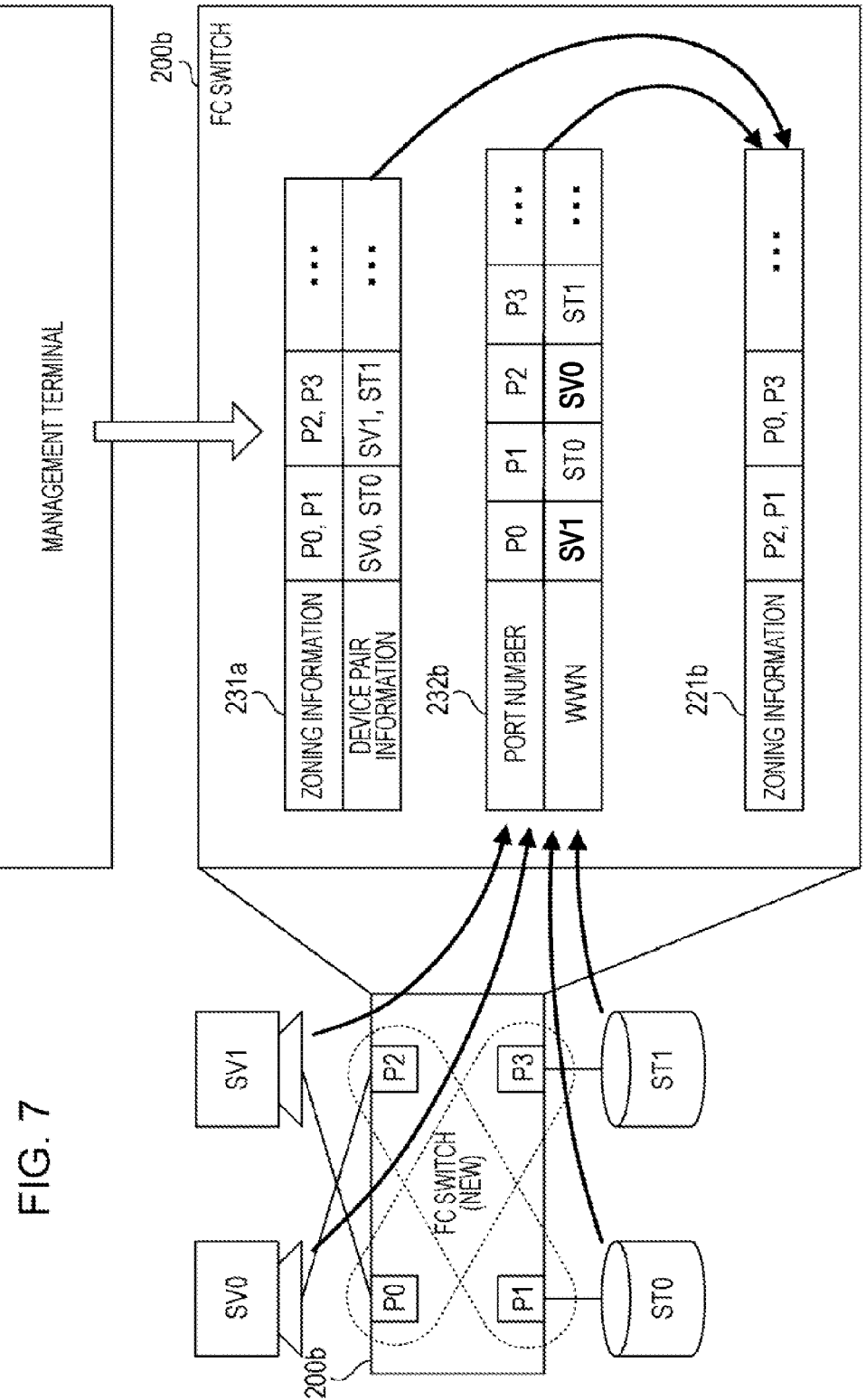
FIG. 7 is a diagram illustrating an example of a process performed when an FC switch is installed.

FIG. 7 is a diagram illustrating a process performed when the new FC switch is installed. More specifically, the process illustrated in FIG. 7 is performed when the FC switch 200a illustrated in FIG. 6 is removed and the new FC switch 200b is installed.

In response to a command from the management terminal 300, the FC switch 200b downloads the connection setting table 231a stored in the management terminal 300. Note that the downloading of the connection setting table 231a may be performed before or after the devices are connected to the respective FC ports of the FC switch 200b.

The following process is performed basically after the devices are connected to the respective FC ports of the FC switch 200b. In the example illustrated in FIG. 7, it is assumed that the server apparatus SV0 is connected not to the FC port P0 but to the FC port P2, and the server apparatus SV1 is connected not to the FC port P2 but to the FC port P0. However, as before the replacement, the storage apparatus ST0 is connected to the FC port P1, and the storage apparatus ST1 is connected to the FC port P3.

The FC switch 200b acquires, from the devices connected to the respective FC ports, the WWNs of the respective devices for each FC port. The FC switch 200b temporarily registers the acquired WWNs in relation to the port numbers of the FC ports in the connected device information 232b.

The FC switch 200b sets the zoning setting table 221b based on the downloaded connection setting table 231a and the connected device information 232b. The FC switch 200b determines, from the connected device information 232b, which FC ports are connected to the devices indicated by the respective WWNs included in the device pair information described in the connection setting table 231a. The FC switch 200b sets the zoning setting table 221b such that port numbers of the FC ports connected to the respective devices registered in the device pair information are described in new zoning information.

In the example illustrated in FIG. 7, based on the device pair information including SV0 and ST0, the FC switch 200b generates zoning information including the port number P2 of the FC port connected to the server apparatus SV0 and the port number P1 of the FC port connected to the storage apparatus ST0, and the FC switch 200b sets the generated the zoning information in the zoning setting table 221b. Furthermore, based on the device pair information including SV1 and ST1, the FC switch 200b generates zoning information including the port number P0 of the FC port connected to the server apparatus SV1 and the port number P3 of the FC port connected to the storage apparatus ST1, and the FC switch 200b sets the generated the zoning information in the zoning setting table 221b.

The switching circuit 211 of the FC switch 200b controls accessing between FC ports based on the set zoning setting table 221b. Thus, as in the state before the FC switch was replaced, the server apparatus SV0 is allowed to access to the storage apparatus ST0, and the server apparatus SV1 is allowed to access to the storage apparatus ST1. That is, although the server apparatuses are connected to FC ports different from those employed before the replacement, accessing is allowed only between the same devices as allowed before the replacement of the FC switch.

By performing the process described above with reference to FIG. 6 and FIG. 7, devices may be connected correctly without the maintenance operator making a confirmation as to the correctness of the connection. Thus, the maintenance operator is allowed to properly perform the replacement operation with high operation efficiency.

Note that in FIG. 6 and FIG. 7, it is assumed by way of example that the connection setting table 231a, in which the zoning information and the device pair information are described in relation to each other, is uploaded to the management terminal 300 and then downloaded into the new FC switch 200b. Alternatively, only the device pair information may be uploaded to the management terminal 300 and then downloaded to the new FC switch 200b.

Figure 8:
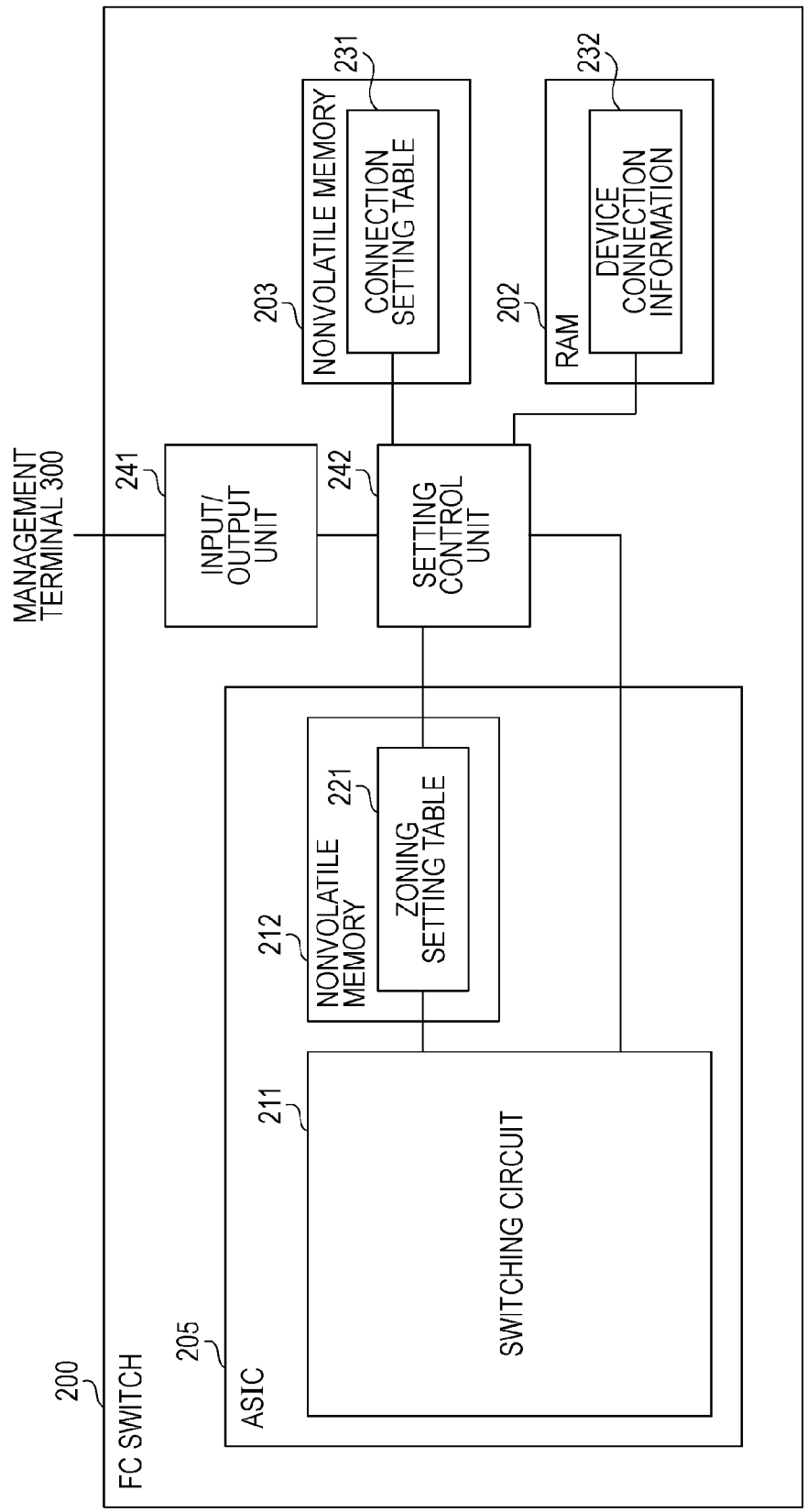
FIG. 8 is a block diagram illustrating an example of a functional configuration of an FC switch.

Next, referring to a block diagram illustrating in FIG. 8, an example of a functional configuration of an FC switch is described. The FC switch 200 includes an input/output unit 241 and a setting control unit 242. The process associated with the input/output unit 241 and the setting control unit 242 may be achieved, for example, by executing firmware by the processor 201 included in the FC switch 200.

In FIG. 8, the input/output unit 241 and the setting control unit 242 respectively perform processes corresponding to those performed by the input unit 11 and the setting unit 12 illustrated in FIG. 1. The switching circuit 211 performs a process corresponding to that performed by the communication control unit 13 illustrated in FIG. 1.

The input/output unit 241 performs a process of interfacing with management terminal 300. For example, the input/output unit 241 notifies the setting control unit 242 of an instruction issued by the management terminal 300. In accordance with the instruction from the setting control unit 242, the input/output unit 241 performs a process such as uploading the connection setting table 231 to the management terminal 300, downloading the connection setting table 231 from the management terminal 300, etc.

The setting control unit 242 generates the connection setting table 231 to be uploaded to the management terminal 300, and sets the zoning setting table 221 and the port setting table 222 based on the connection setting table 231 downloaded from the management terminal 300.

The setting control unit 242 stores the connection setting table 231 in the nonvolatile memory 203 and temporarily stores the connected device information 232 in the RAM 202. The setting control unit 242 registers the zoning setting table 221 in the nonvolatile memory 212 in the ASIC 205 such that the switching circuit 211 is allowed to refer to the zoning setting table 221. The information in the zoning setting table 221, the connection setting table 231, and the connected device information 232 is registered in the manner described above with the reference to FIG. 6 and FIG. 7.

Figure 9:
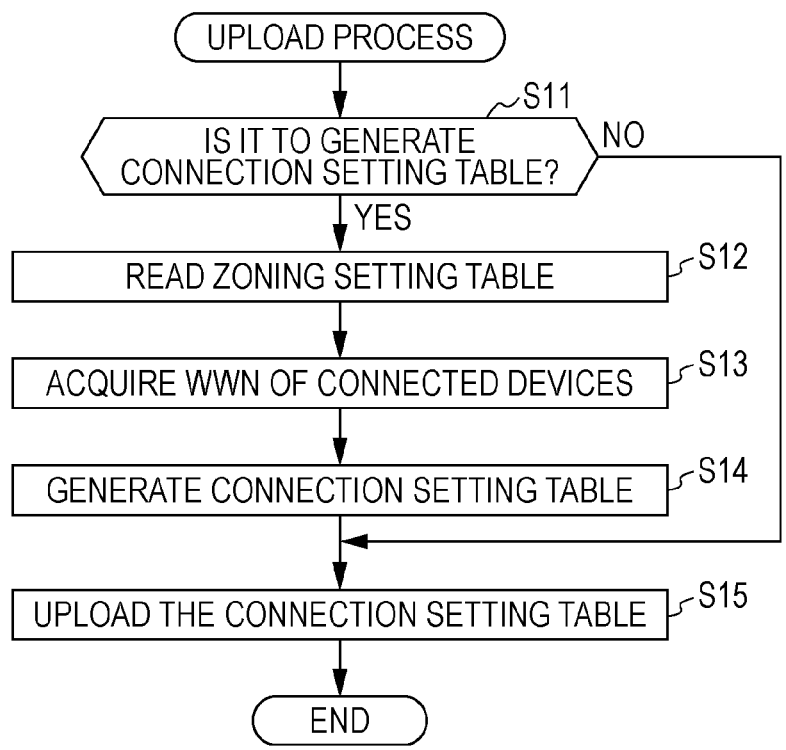
FIG. 9 is a flow chart illustrating an example of a process of uploading a connection setting table.

Next, a process associated with the FC switch 200 is described below with reference to FIG. 9. FIG. 9 is a flow chart illustrating an example of a process of uploading a connection setting table. This process illustrated in FIG. 9 is performed in response to a command issued by the management terminal 300 operated by a maintenance operator when the FC switch 200 is replaced with another FC switch.

In Step S11, the setting control unit 242 determines whether to generate a connection setting table 231. In a case where it is determined to generate a connection setting table 231, the process proceeds to step S12, but otherwise the process proceeds to step S15.

In this step S11, in a case where the connection setting table 231 is already registered in the nonvolatile memory 203, the setting control unit 242 performs step S15 without resetting the connection setting table 231. On the other hand, in a case where the connection setting table 231 is not registered in the nonvolatile memory 203, the setting control unit 242 performs step S12 to set the connection setting table 231. However, for example, in a case where a resetting command is given by a maintenance operator via the management terminal 300, the setting control unit 242 may reset the connection setting table 231 even when the connection setting table 231 is registered in the nonvolatile memory 203.

In Step S12, the setting control unit 242 reads the zoning setting table 221 from the nonvolatile memory 212 of the ASIC 205.

In Step S13, the setting control unit 242 accesses to the devices connected to the respective FC ports via the switching circuit 211, and acquires WWNs from the respective connected devices. The setting control unit 242 registers, in the connected device information 232, the WWNs acquired from the respective devices in relation to the port numbers of the FC ports to which the respective devices are connected. Note that steps S12 and S13 may be performed in an opposite order.

In Step S14, the setting control unit 242 generates a connection setting table 231 based on the zoning setting table 221 and the connected device information 232. The setting control unit 242 acquires, from the connected device information 232, the WWNs assigned to the two port numbers described in the zoning information in the connection setting table 231, and the setting control unit 242 registers, in the connection setting table 231, device pair information associated with the acquired two WWNs in relation to the zoning information. The setting control unit 242 registers the device pair information in relation to the zoning information in the connection setting table 231 for all pieces of zoning information set in the zoning setting table 221.

In Step S15, in response to a command from the setting control unit 242, the input/output unit 241 uploads the connection setting table 231 to the management terminal 300.

Figure 10:
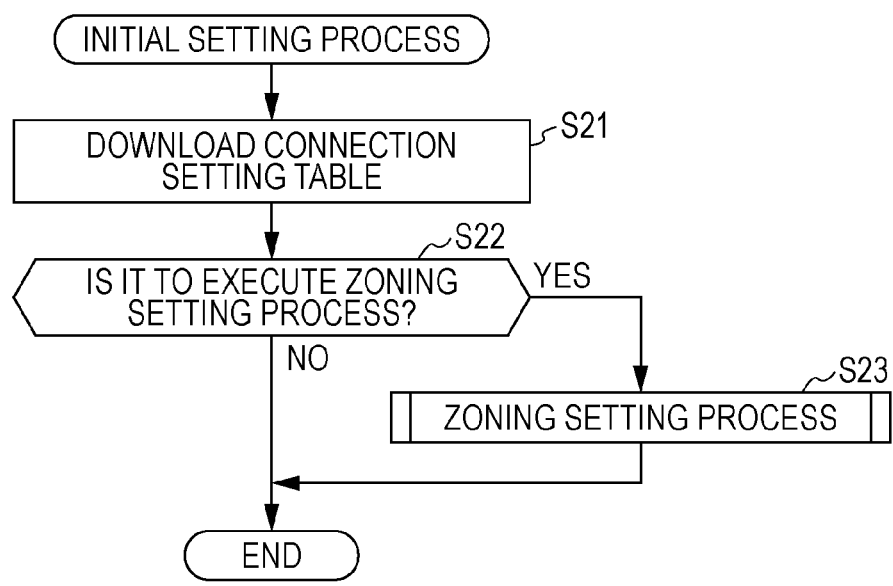
FIG. 10 is a flow chart illustrating an example of a process of initially setting an FC switch.

FIG. 10 is a flow chart illustrating an example of a process of initially setting the FC switch. The process in FIG. 10 is performed when the FC switch 200 is initially installed in a storage system. For example, the process in FIG. 10 is performed initially after the electric power of the FC switch 200 is turned on for the first time. The process in FIG. 10 may be performed before or after devices such as server apparatuses, storage apparatuses, or the like are connected to the FC switch 200.

In Step S21, in response to a command from the setting control unit 242, the input/output unit 241 downloads the connection setting table 231 from the management terminal 300. The setting control unit 242 stores the downloaded connection setting table 231 in the nonvolatile memory 203.

In Step S22, after the downloading, the setting control unit 242 determines whether to perform a setting process (zoning setting process) for the port zoning. When it is determined to perform the zoning setting process, the setting control unit 242 performs step S23. However, when it is determined not to perform the zoning setting process at this time, the process is ended. The determination as to whether to perform the zoning setting process is made according to an input operation on the management terminal 300 by the maintenance operator.

In Step S23, the setting control unit 242 performs the zoning setting process. More specifically, in this step S23, a process is performed as illustrated in FIG. 11.

Figure 11:
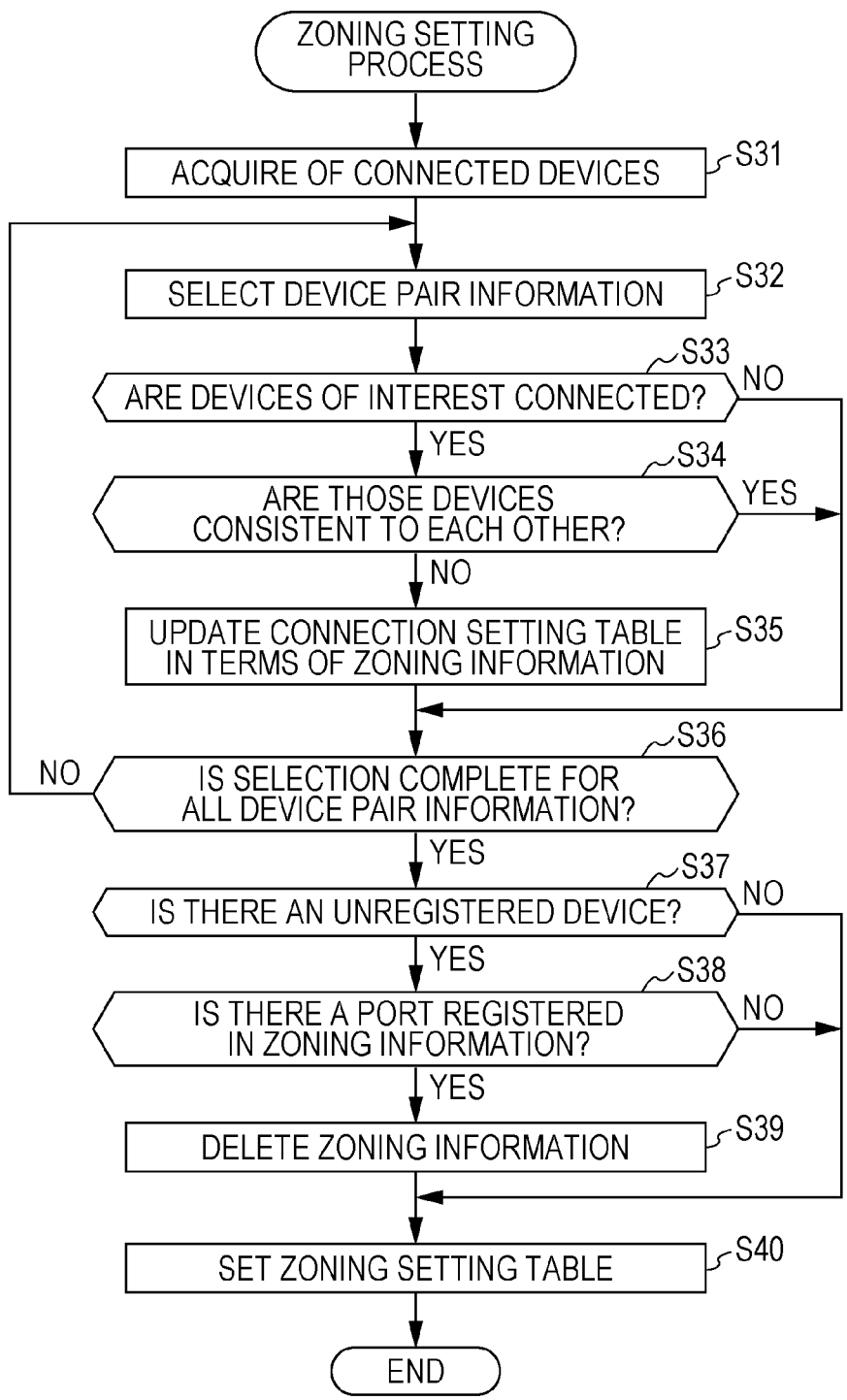
FIG. 11 is a flow chart illustrating an example of a process of setting zoning.

FIG. 11 is a flow chart illustrating an example of a zoning setting process. The process in FIG. 11 is performed, for example, in response to a command from the management terminal 300 after the electric power of the FC switch 200 is turned on, or the process is performed in step S23 in FIG. 10.

In Step S31, the setting control unit 242 accesses to the devices connected to the respective FC ports via the switching circuit 211, and acquires the WWNs from the respective devices connected. The setting control unit 242 registers, in the connected device information 232, the WWNs acquired from the respective devices in relation to the port numbers of the FC ports to which the respective devices are connected.

In Step S32, the setting control unit 242 selects unselected one piece of device pair information from the connection setting table 231 stored in the nonvolatile memory 203.

In Step S33, the setting control unit 242 refers to the connected device information 232 and determines whether both devices registered in the device pair information selected in step S32 are currently connected to the FC switch 200. In a case where it is determined that both devices are connected to the FC switch 200, the setting control unit 242 performs a process in step S34. On the other hand, in a case where at least one of the two devices is not connected to the FC switch 200, the setting control unit 242 performs a process in step S36.

In Step S34, the setting control unit 242 checks whether the port numbers of the FC ports connected to the two devices registered in the device pair information selected in step S32 are the same as those registered in the zoning information that is described, in relation to the device pair information, in the connection setting table 231, for all pieces of device pair information. In a case where the port numbers are consistent for all pieces of device pair information, the setting control unit 242 performs a process in step S36. However, when even at least one of the port numbers is not consistent, the setting control unit 242 performs a process step S35.

In Step S35, the setting control unit 242 updates the zoning information related to the device pair information selected in step S32 with the port numbers of the FC ports currently connected to the two devices registered in this device pair information.

In Step S36, the setting control unit 242 determines whether the selection has been made for all pieces of device pair information registered in the connection setting table 231. In a case where the setting control unit 242 determines that there is unselected device pair information, the process returns to step S32 to select an unselected piece of device pair information. On the other hand, in a case where the setting control unit 242 determines that all pieces of device pair information have been selected, the setting control unit 242 performs a process in step S37.

In Step S37, the setting control unit 242 checks the connection setting table 231 and the connected device information 232 to determine whether the devices currently connected to the FC switch 200 include a device that is not registered in any device pair information described in the connection setting table 231. In a case where there is a device that is not registered in any device pair information, the setting control unit 242 performs a process in step S38. However, in a case where there is no device unregistered in any device pair information, the setting control unit 242 performs a process in step S40.

In Step S38, the setting control unit 242 determines whether FC ports connected to devices unregistered in device pair information include an FC port that is registered in some zoning information described in the connection setting table 231. In a case where there is a FC port registered in some zoning information, the setting control unit 242 performs a process in step S39. However, in a case where there is no FC port registered in any zoning information, the setting control unit 242 performs a process in step S40.

In Step S39, the setting control unit 242 selects, from the connection setting table 231, one piece of zoning information including an FC port that is connected to a device unregistered in any device pair information. The setting control unit 242 then deletes the port number registered in the selected zoning information such that the zoning information becomes blank. As a result, the FC port connected to the device unregistered in any device pair information is removed from the zoning setting table 221, which causes the device unregistered in any device pair information to be disabled to access to any other devices via the FC switch 200.

In Step S40, the zoning information of which pairs of port numbers is registered in the connection setting table 231 is registered is in the zoning setting table 221 in the nonvolatile memory 212. As a result, the devices connected to the FC switch 200 are zoned such that devices registered in each piece of device pair information are coupled and allowed to transmit and receive data to each other. In a case where an FC port is connected to a device unregistered in any device pair information, the FC port connected to this device is not set in the zoning setting table 221. Therefore, a device to which permission to perform accessing is not given by any device pair information is disabled to transmit or receive data via the FC switch 200.

Figure 12:
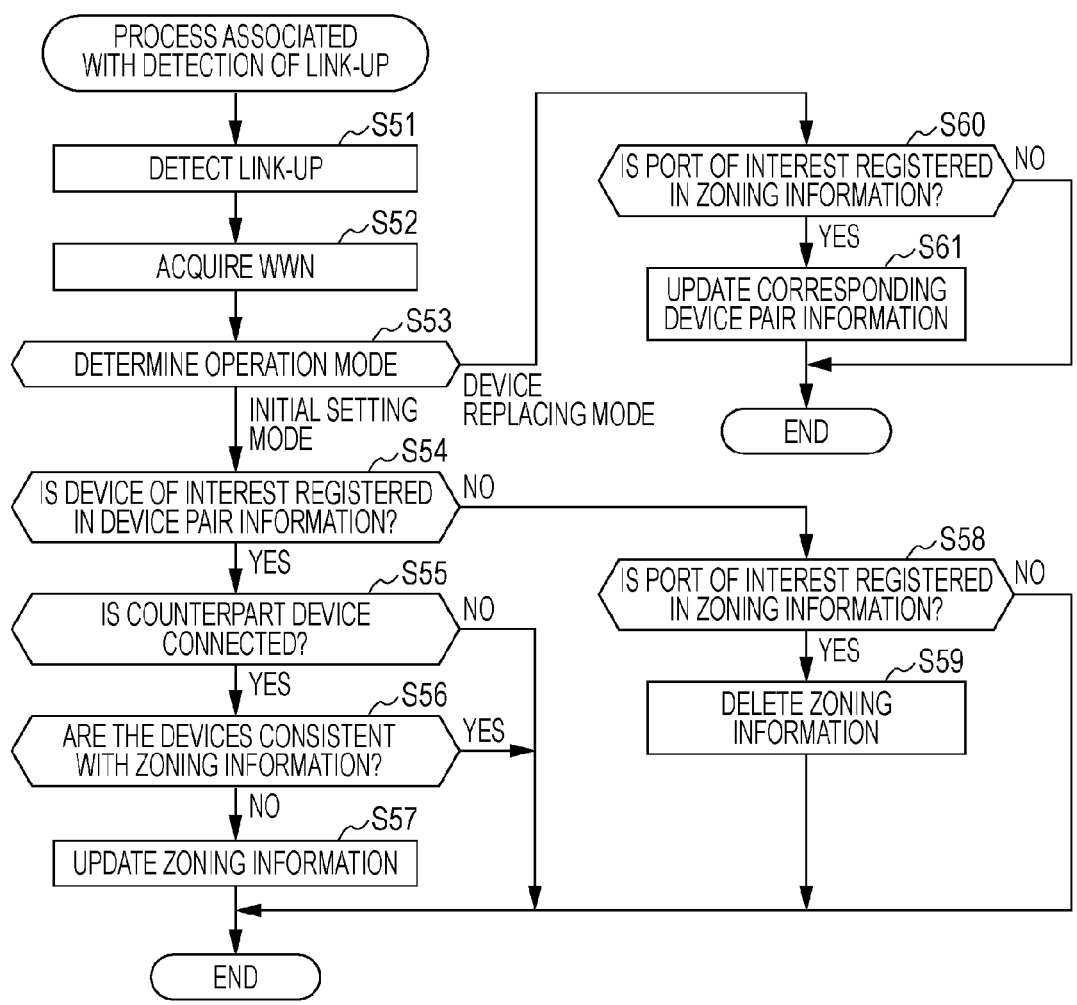
FIG. 12 is a flow chart illustrating an example of a process performed when a link-up of a device is detected.

FIG. 12 is a flow chart illustrating an example of a process performed when a link-up of a device is detected.

In Step S51, when the switching circuit 211 detects linking-up of a device via some FC port, the switching circuit 211 notifies the setting control unit 242 of the fact that the link-up has been detected and of the port number of the FC port to which the link-up has occurred.

In Step S52, the setting control unit 242 accesses to the device linked up to the FC port via the switching circuit 211 to acquire the WWN of the device connected to the FC port. The setting control unit 242 registers, in the connected device information 232, the WWN of the connected device in relation to the port number of the FC port to which the device is connected.

In Step S53, the FC switch 200 is capable of being set in an initial setting mode or a device replacing mode as an operation mode. The operation mode is specified by the management terminal 300 in accordance with an input operation performed by a maintenance operator, and information indicating the specified operation mode is stored, for example, in the nonvolatile memory 203 of the FC switch.

The initial setting mode is an operation mode in which it is allowed to set the zoning setting table 221. This operation mode is used, for example, when the initial setting process illustrated in FIG. 10 or the zoning setting process illustrated in FIG. 11 is performed. For example, after the zoning setting process illustrated in FIG. 11 is performed, when all devices to be connected are not connected to the FC switch 200, or when an incorrectly-connected device is disconnected from the FC switch 200, the operation mode is maintained in the initial setting mode and a process illustrated in FIG. 12 is performed.

On the other hand, the device replacing mode is used when a normal operation of the storage system 100 including the FC switch 200 is started after the setting of the zoning setting table 221 is complete. In the device replacing mode, detecting a link-up in step S51 may occur, for example, when some device connected to the FC switch 200 is disconnected and a new device is connected for replacement.

In a case where the determination performed by the setting control unit 242 in step S53 as to the current operation mode indicates that the operation mode is in the initial setting mode, the setting control unit 242 performs a process in step S54. However, in a case where the current operation mode is in the device replacing mode, the setting control unit 242 performs a process in step S60.

In Step S54, the setting control unit 242 determines whether the WWN of the connected device is registered in some device pair information in the setting table 231. In a case where the WWN is registered in some device pair information, the setting control unit 242 performs a process in step S55. However, in a case where the WWN is not registered in any device pair information, the setting control unit 242 performs a process in step S59.

In Step S55, the setting control unit 242 checks the device pair information in which the WWN of the connected device is registered, and determines whether a device corresponding to a counterpart WWN registered in the same device pair information is currently connected to the FC switch 200. When the counterpart WWN registered in the device pair information is registered in the connected device information 232, the setting control unit 242 regards that the device corresponding to the counterparts WWN is connected to the FC switch 200. In a case where the device corresponding to the counterparts WWN is connected to the FC switch 200, the setting control unit 242 performs a process in step S56, but otherwise the process is ended.

In Step S56, the setting control unit 242 refers to the zoning information, in the connection setting table 231, related to the device pair information in which the WWN of the connected device is registered, and the setting control unit 242 determines whether the port number of the FC port to which the link-up was detected in step S51 is registered in the zoning information being referred to. In a case where the port number is registered in the zoning information, the setting control unit 242 ends the process. However, in a case where the port number is not registered, the setting control unit 242 performs a process in step S57.

In Step S57, the setting control unit 242 updates the zoning information in the connection setting table 231 such that the port numbers described in the zoning information referred to in step S56 are replaced with port numbers to which the respective devices registered in corresponding device pair information are currently connected. Furthermore, the setting control unit 242 updates a particular one of pieces of zoning information in the zoning setting table 221 such that the pair of old port numbers registered in the particular zoning information is replaced by the pair of new updated port numbers.

A supplementary description is given below in terms of the process from step S54 to step S57.

In the zoning setting process illustrated in FIG. 11, even when there is at least one of two devices registered in some device pair information is not connected to the FC switch 200, the zoning information related to this device pair information is set in the zoning setting table 212. For example, in the connection setting table 231, device pair information including SV1 and ST1 is related to zoning information including P2 and P3. Herein, let it be assumed that only the server apparatus SV1 is connected to the FC switch 200 but the storage apparatus ST1 is not connected.

In this case, the answer to step S33 in FIG. 11 is No, and the zoning information including P2 and P3 remains in the connection setting table 231. Thereafter, in step S40 in FIG. 11, the zoning information including P2 and P3 is set in the zoning setting table 221.

Thereafter, when the storage apparatus ST1 is connected to the FC switch 200, then in step S54 in FIG. 12, Yes is given as the answer, and Yes in step S55. Let it be assumed that before the storage apparatus ST1 is connected, no device is connected to the FC port P3.

When the storage apparatus ST1 is connected to the FC port P3, this causes the determination to be performed in step S56 such that Yes is given. In this case, the zoning information including P2 and P3 set in the zoning setting table 221 is correct, and thus the zoning information is maintained. On the other hand, when the storage apparatus ST1 is connected to an FC port other than the FC port P3, this causes the answer in step S56 to become No. When the storage apparatus ST1 is connected, for example, to the FC port P4, then in step S57, the zoning information including P2 and P3 set in the zoning setting table 221 (and also in the connection setting table 231) is updated such that the zoning information includes P2 and P4.

When a device registered in device pair information is newly connected after the zoning setting process illustrated in FIG. 11 is performed, then, in steps S54 to S57, zoning information corresponding to this device pair information is automatically registered in the zoning setting table 221 and thus it becomes possible for the devices registered in the device pair information to communicate with each other.

In the zoning setting process in FIG. 11, for example, in a case where at least one of two devices registered in some device pair information is not connected to the FC switch 200, the zoning information related to this device pair information may not be set in the zoning setting table 212. To do so, for example, when the answer to step S33 in FIG. 11 is No, the setting control unit 242 may delete the port numbers from the zoning information related to the selected device pair information.

In Step S58, the setting control unit 242 refers to the connection setting table 231 and determines whether the port number of the FC port to which the link-up is detected in step S51 is registered in some zoning information. In a case where the port number is registered in some zoning information, the setting control unit 242 performs a process in step S59, but otherwise the process is ended.

In Step S59, of the plurality of pieces of zoning information in the connection setting table 231, a particular piece of zoning information, in which the port number of the FC port to which the link-up was detected, is subjected to a process performed by the setting control unit 242 to delete the pair of port numbers from this particular piece of zoning information. Furthermore, the setting control unit 242 performs a process such that of the plurality of pieces of zoning information in the zoning setting table 221, the particular piece of zoning information, in which the port number of the FC port to which the link-up was detected, is deleted.

When a device unregistered in any device pair information is connected to an FC port registered in some zoning information, then, in steps S58 and S59, the zoning information in which the FC port connected to the device is registered is deleted from the zoning setting table 221. As a result, even when a device, to which permission to perform accessing is not given by any device pair information, is newly connected, this device is disabled to transmit/receive data via the FC switch 200.

In Step S60, the setting control unit 242 refers to the connection setting table 231 and determines whether the port number of the FC port to which the link-up was detected in step S51 is registered in some zoning information. In a case where the port number is registered in the zoning information, the setting control unit 242 performs a process in step S63, but otherwise the process is ended.

In Step S61, based on the connection setting table 231, the setting control unit 242 identifies device pair information related to the zoning information in which the port number of the FC port to which the link-up was detected is registered. More specifically, the identifying the device pair information may be performed as follows. First, a device is detected which is currently connected to an FC port indicated by a port number registered as a counterpart of a pair in the zoning information including the port number of the FC port to which the link-up was detected. Next, device pair information is identified in which a WWN of the detected device is registered.

The setting control unit 242 updates the identified device pair information with the WWN of the device currently connected to the FC port registered in the corresponding zoning information. As a result, the WWN of the device newly connected for replacement is registered in the device pair information, and thus the new device is enabled to transmit and receive data via the FC switch 200.

By performing the process illustrated in FIG. 12, even when a new device is connected to the FC switch 200, the FC switch 200 is capable of automatically making a proper change in setting of the zoning setting table 221. Furthermore, even when a connected device is replaced, the FC switch 200 is capable of automatically changing the device pair information in which the replaced device is registered such that the new device is allowed to be used after the replacement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay apparatus configured to relay data transmitted and received between a plurality of devices, comprising:
   a memory; and
   a processor coupled to the memory and configured to:
   receive device group information, data transmission and reception between a first device and a second device to be allowed if the first device and the second device are registered in the device group information;
   detect devices connected to respective communication ports of the relay apparatus and to register, in port group information, information associated with the communication ports respectively connected to the first device and the second device when the first device and the second device are connected to the relay apparatus, wherein the port group information indicates a pair of the communication ports respectively connected to the first device and the second device specified by the device group information as a pair of devices between which transmission and reception of data are to be enabled; and
   enable transmission and reception of data between the communication ports registered in the port group information.

2. The relay apparatus according to claim 1, wherein the processor is further configured to output the device group information in which devices are registered, the devices being currently connected to the respective communication ports registered in the port group information.

3. The relay apparatus according to claim 1, wherein the processor is further configured to disable transmission and reception of data via the communication port to which the device is connected when a device unregistered in the device group information is connected one of communication ports of the relay apparatus.

4. The relay apparatus according to claim 1, wherein the processor is further configured to:
   when a new device is connected to one of the communication ports of the relay apparatus, determine an operation mode in which the relay apparatus is currently set,
   in a case where the relay apparatus is set in a first operation mode, determine whether the new device is registered in the device group information,
   in a case where the new device is not registered, disable transmission and reception of data via the communication port to which the new device is connected,
   in a case where the relay apparatus is set in a second operation mode, determine whether the communication port to which the new device is connected is registered in the port group information,
   in a case where the communication port is registered, select device group information including a device connected to a communication port registered in the port group information including the communication port connected to the new device, and
   register the new device in the selected device group information.

5. A storage system comprising:
   a plurality of information processing apparatuses;
   a plurality of storage apparatuses; and
   a relay apparatus configured to relay data transmitted and received between the plurality of information processing apparatuses and the plurality of storage apparatuses, the relay apparatus comprising:
   a memory; and
   a processor coupled to the memory and configured to:
   receive device group information indicating a registered pair of an information processing apparatus included in the plurality of information processing apparatus and a storage apparatus included in the plurality of storage apparatuses, transmission and reception of data to be enabled between the information processing apparatus and the storage apparatus if the information processing apparatus and the storage apparatus are registered in the device group information;
   detect information processing apparatuses and storage apparatuses connected to respective communication ports of the relay apparatus, and in a case where the information processing apparatus and the storage apparatus registered in the device group information are connected to the relay apparatus, register, in port group information, communication ports to which the information processing apparatus and the storage apparatus registered in the device group information are respectively connected, wherein the port group information indicates a pair of the communication ports respectively connected to the information processing apparatus and the storage apparatus specified by the device group information as a pair of devices between which transmission and reception of data are to be enabled; and
   enable transmission and reception of data between the communication ports registered in the port group information.

6. The storage system according to claim 5, wherein the processor is further configured to output the device group information in which an information processing apparatus and a storage apparatus are registered that are currently connected to respective communication ports registered in the port group information.

7. The storage system according to claim 5, wherein the processor is further configured to disable transmission and reception of data via the communication port to which the device is connected when a device unregistered in the device group information is connected one of communication ports of the relay apparatus.

8. The storage system according to claim 5, wherein the processor is further configured to:
   when a new device is connected to one of the communication ports of the relay apparatus, determine an operation mode in which the relay apparatus is currently set,
   in a case where the relay apparatus is set in a first operation mode, determine whether the new device is registered in the device group information,
   in a case where the new device is not registered, to disable transmission and reception of data via the communication port to which the new device is connected, in a case where the relay apparatus is set in a second operation mode, determine whether the communication port to which the new device is connected is registered in the port group information, in a case where the communication port is registered, select device group information including a device connected to a communication port registered in the port group information including the communication port connected to the new device, and register the new device in the selected device group information.

9. A method of controlling a relay apparatus configured to relay data transmitted and received between a plurality of devices, comprising:

receiving device group information indicating transmission and reception of data are to be enabled between a first device and a second device if the first device and the second device are registered in the device group information as a pair of devices;

detecting devices connected to respective communication ports of the relay apparatus;

in a case where the first device and the second device registered in the device group information are connected to the relay apparatus, registering, in port group information, communication ports to which the first device and the second device are respectively connected, wherein the port group information indicates a pair of the communication ports respectively connected to the first device and the second device specified by the device group information as the pair of devices between which transmission and reception of data are to be enabled; and enabling transmission and reception of data between the communication ports registered in the port group information.

10. The method of controlling the relay apparatus according to claim 9, further comprising outputting device group information in which devices are registered which are currently connected to the respective communication ports registered in the port group information.

11. The method of controlling the relay apparatus according to claim 9, further comprising, in a case where a device unregistered in the device group information is connected to one of communication ports of the relay apparatus, disabling transmission and reception of data via the communication port to which the unregistered device is connected.

12. The method of controlling the relay apparatus according to claim 9, further comprising:

when a new device is connected to one of the communication ports of the relay apparatus, determining an operation mode in which the relay apparatus is currently set;

in a case where the relay apparatus is set in a first operation mode, determining whether the new device is registered in the device group information;

in a case where the new device is not registered, disabling transmission and reception of data via the communication port to which the new device is connected;

in a case where the relay apparatus is set in a second operation mode, determining whether the communication port to which the new device is connected is registered in the port group information;

in a case where the communication port is registered, selecting device group information including a device connected to a communication port registered in the port group information including the communication port connected to the new device; and registering the new device in the selected device group information.

* * * * *